(12) United States Patent
Nishida et al.

(10) Patent No.: US 6,780,098 B2
(45) Date of Patent: Aug. 24, 2004

(54) REGULATOR FOR AIR OUTLET

(75) Inventors: Ryuhei Nishida, Yokohama (JP); Kihwan Choi, Ulsan-shi (KR)

(73) Assignee: Nifco Inc., Yokohama (JP)

( * ) Notice: Subject to any disclaimer, the term of this patent is extended or adjusted under 35 U.S.C. 154(b) by 16 days.

(21) Appl. No.: 10/359,161

(22) Filed: Feb. 6, 2003

(65) Prior Publication Data

US 2003/0157880 A1 Aug. 21, 2003

(30) Foreign Application Priority Data

Feb. 15, 2002 (JP) .................................. 2002-038448
Apr. 24, 2002 (JP) .................................. 2002-122486

(51) Int. Cl.[7] ............................................... F24F 13/15
(52) U.S. Cl. ....................... 454/155; 454/315; 454/318; 454/322
(58) Field of Search .............................. 454/155, 202, 454/313, 315, 318, 319, 320, 322, 325, 333, 335

(56) References Cited

U.S. PATENT DOCUMENTS

| | | | | |
|---|---|---|---|---|
| 3,996,845 A | * | 12/1976 | Harris | .................. 454/320 |
| 4,907,500 A | * | 3/1990 | Brown | .................. 454/290 |
| 5,069,112 A | * | 12/1991 | Takayama et al. | .......... 454/162 |
| 5,584,098 A | * | 12/1996 | Koyama et al. | .............. 16/441 |
| 6,206,777 B1 | * | 3/2001 | Eriksson et al. | ............ 454/155 |
| 6,394,891 B1 | * | 5/2002 | Arold | .................. 454/155 |
| 2003/0050001 A1 | * | 3/2003 | Kamio | .................. 454/155 |

FOREIGN PATENT DOCUMENTS

| | | | | |
|---|---|---|---|---|
| DE | 34 38 740 | * | 4/1986 | .................. 454/155 |
| EP | 0 289 065 | * | 11/1988 | .................. 454/155 |
| JP | 59-70813 | * | 5/1984 | .................. 454/155 |
| JP | 60-243441 | * | 12/1985 | .................. 454/155 |

* cited by examiner

Primary Examiner—Harold Joyce
(74) Attorney, Agent, or Firm—Kanesaka & Takeuchi

(57) ABSTRACT

A regulator for regulating airflow through an air outlet includes a plurality of louver blades integrated with axis portions supported at bearing holes and interconnected through an interlocking member; a supporting plate with the bearing holes attached to an air outlet; and an elastic portion provided on the supporting plate to be capable of deforming along an axis of the louver blades. Also, the regulator may include a damper; a manual operating member for tilting the louver blades and damper; and two gears engaging each other and disposed at an interconnecting portion between the manual operating member and the damper. One of the gears is formed in two portions separated along an axis and provided coaxially. The two portions have slightly shifted pitch, and are able to displace with each other in a circumferential direction with elasticity.

11 Claims, 8 Drawing Sheets

REGULATOR FOR AIR OUTLET

BACKGROUND OF THE INVENTION AND RELATED ART STATEMENT

The present invention relates to a regulator for regulating airflow through an air outlet. In particular, the invention relates to a regulator for regulating airflow through an air outlet having multiple louver blades integrated with a shaft supported in a bearing hole and interconnected via an interlocking member.

In an air outlet through which air flows out into a car compartment of an automobile, a louver is provided for adjusting a wind direction. The louver is generally interconnected to multiple louver blades through an interlocking member such as a link mechanism or cam mechanism. The multiple louver blades provided in the air outlet can change a direction as a whole by manually rotating an operating member such as a dial partially exposed at a front surface of an instrument panel (see Japanese Patent Publications (KOKAI) No. 63-112210 and No. 11-70814).

The louver blades composing the louver directly receive a wind pressure, thus the louver blades tend to vibrate if there is a gap, thereby causing a squeak and rattle. In order to support the louver blade without a gap, a shaft portion formed integrally on the louver blade must fit tightly to a bearing hole formed in a framing member.

However, in order to tightly fit the shaft to the bearing hole, high tolerance in manufacturing and assembly is required, thereby complicating the manufacturing process. Also, the framing member for supporting the louver and louver blade is generally formed of an injection molded thermoplastic. However, due to a change in temperature or an extent of air conditioning, the louver blades and the framing member may be deformed under heat. Thus, it is difficult to adjust the louver blade with a constant force due to the deformation.

Moreover, in the link mechanism or cam mechanism as disclosed in Japanese Patent Publications, it is difficult to obtain a linear relationship between a rotational angle of the manual operating member and a tilting angle of the louver blades. It is also difficult to operate with a constant control force over the entire operation range, thereby preventing a smooth operation.

The present invention has been made in order to solve the problems in the conventional technology, and a main object is to provide a regulator for regulating airflow through an air outlet that can be operated smoothly and reduce a gap, without complicating the manufacturing process and being affected by the temperature change.

Further objects and advantages of the invention will be apparent from the following description of the invention.

SUMMARY OF THE INVENTION

In order to achieve the above-mentioned objects, according to the present invention, a regulator for regulating airflow through an air outlet includes a plurality of louver blades interconnected through an interlocking or interconnecting member; a damper provided in an air path; a manual operating member for tilting the louver blades and damper; and two gear means engaging with each other and disposed at an interconnecting portion between the manual operating member and the damper. One of the gear means is formed in two portions separated along an axis and provided coaxially. The two portions are slightly shifted in pitch, and are connected to be able to displace with each other in a circumferential direction with elasticity. With this configuration, the two portions have the shifted pitch and contact the inside of the other gear tooth with the elasticity, thereby preventing a backlash.

Also, the louver blades and the interlocking member may be connected through an axis direction pin projecting at a location offset from a rotational center of the louver blades, and a long hole with a long axis situated on a line parallel to a straight line between a substantial middle point of a rotational range of the pin and a center of tilting of the louver blades. With this configuration, it is possible to minimize a frictional angle between the long hole and the pin during the tilting motion of the louver blades.

Further, rotational resistance applying means may be provided in the rotational center axis of the manual operating member. Thus, a gap at the manual operating member can effectively be eliminated, thereby preventing a gap at the louver blades connected to the manual operating member.

According to another aspect of the present invention, a regulator for regulating airflow through an air outlet includes a plurality of louver blades integrated with axis portions supported at bearing holes and interconnected through a link plate; a supporting plate with the bearing holes attached to an air outlet; and an elastic portion provided on the supporting plate and being capable of deforming along an axis of the louver blades. With this configuration, the supporting plate can elastically deform to absorb a heat deformation between the air outlet and the louver blades.

Further, the elastic portion may be provided on both ends of the supporting plate or the elastic portion may have a branched portion to improve stability in attaching the supporting plate to the air outlet.

Further, O-rings formed of a silicon resin with self-lubricity may be placed at a supporting shaft of the rotational operating member to displace the interlocking member in the horizontal direction, thereby reducing a fluctuation in torque with the temperature change.

DETAILED DESCRIPTION OF PREFERRED EMBODIMENTS

Figure 1:
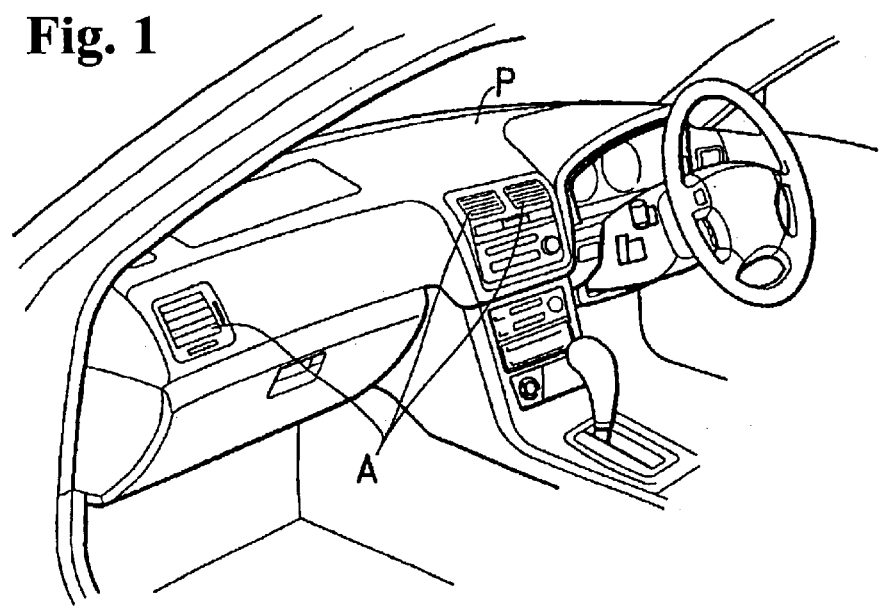
FIG. 1 is a perspective view of an instrument panel of an automobile according to the present invention.

FIG. 1 shows a surrounding of an instrument panel P in an automobile where the present invention is applied. At both right and left ends and a center of the instrument panel P, air outlets A are provided. Each of the air outlets A is connected to an air duct provided inside the instrument panel P, and a blower blows air into a car compartment through an air conditioning system.

Figure 2:
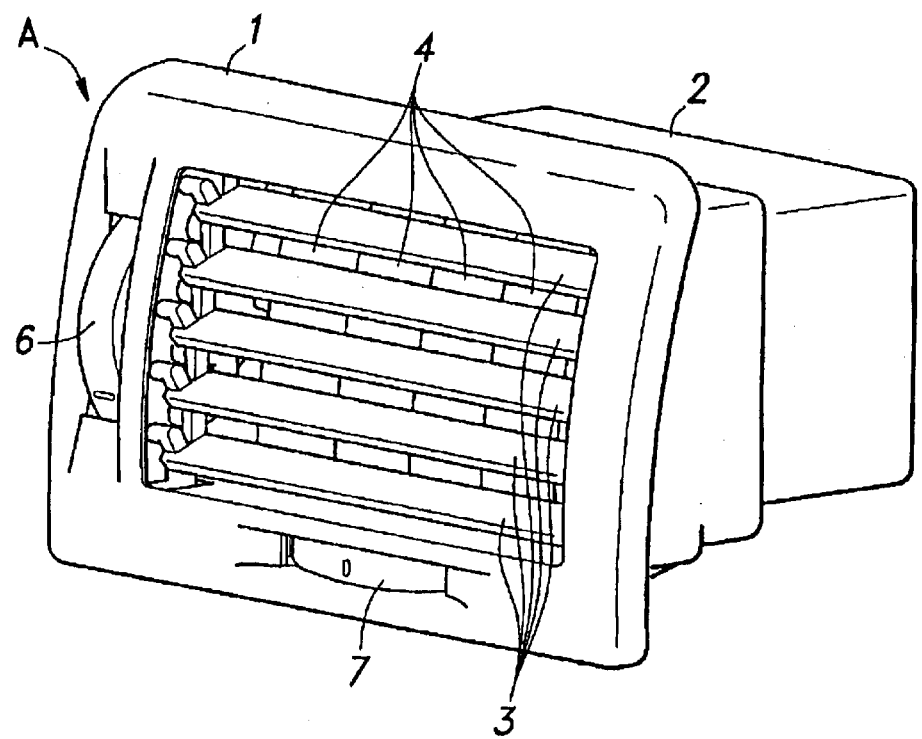
FIG. 2 is a perspective view of an air outlet according to the present invention.

As shown in FIG. 2, the air outlet A includes a case 2 having a rectangular hollow shape; a flange 1 formed on a connecting port of the case 2 on the instrument panel P facing the car compartment; a plurality of horizontal louver blades 3 supported on an axis to be able to tilt freely and disposed in the case 2; a plurality of vertical louver blades 4 supported on an axis to be able to tilt freely and disposed in the case 2; and a damper 5 (see FIG. 3) having a butterfly valve for controlling airflow from an air duct (not shown).

The horizontal louver blades 3 are tilted around a horizontal axis for shifting a vertical wind direction through a rotational operation of a side dial 6 provided at a left end of the flange 1 shown in FIG. 2. The vertical louver blades 4 are tilted around a vertical axis for shifting a horizontal wind direction through a rotational operation of an underneath dial 7 provided at a lower end of the flange 1 shown in FIG. 2.

The side dial 6 is supported on a sidewall of the case 2 to be able to rotate freely. A part of an outer circumferential surface of the side dial 6 is slightly exposed from the front surface of the flange 1. The part exposed from the front surface of the flange 1 can be operated to rotate with a fingertip. Also, the underneath dial 7 is supported on the bottom wall of the case 2 with an axis to be able to rotate freely. A part of the outer circumferential surface of the underneath dial 7 slightly projects from the front surface of the flange 1 like the side dial 6. The part exposed from the front surface of the flange 1 can be operated to rotate with a fingertip.

Figure 3:
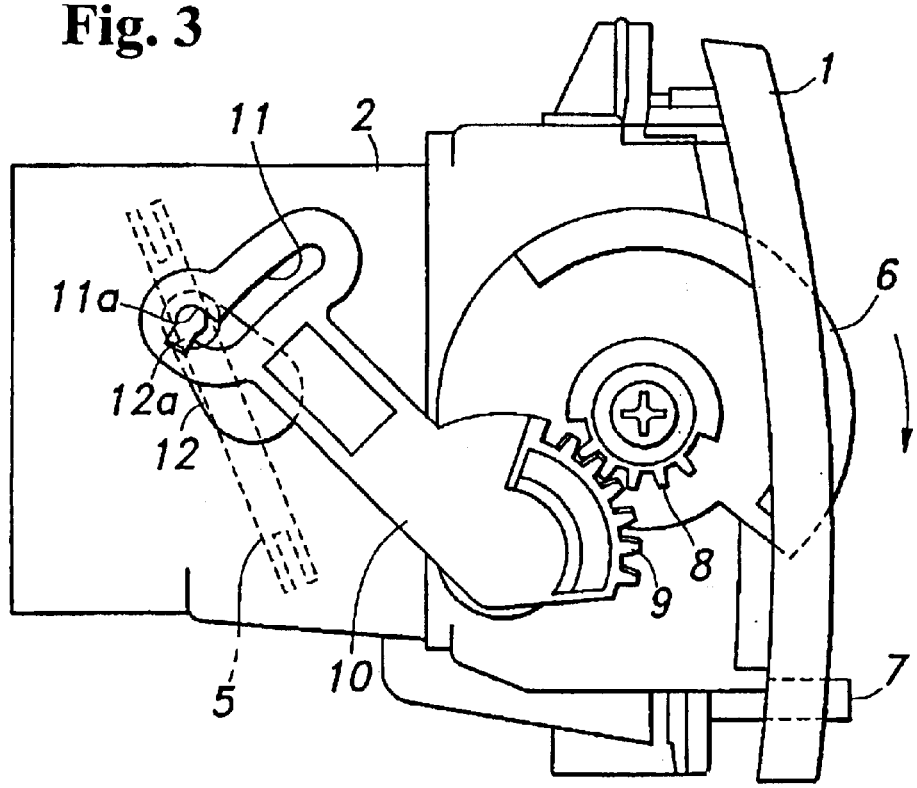
FIG. 3 is a left side view of the air outlet shown in FIG. 2 in a state where a damper is closed.
Figure 4:
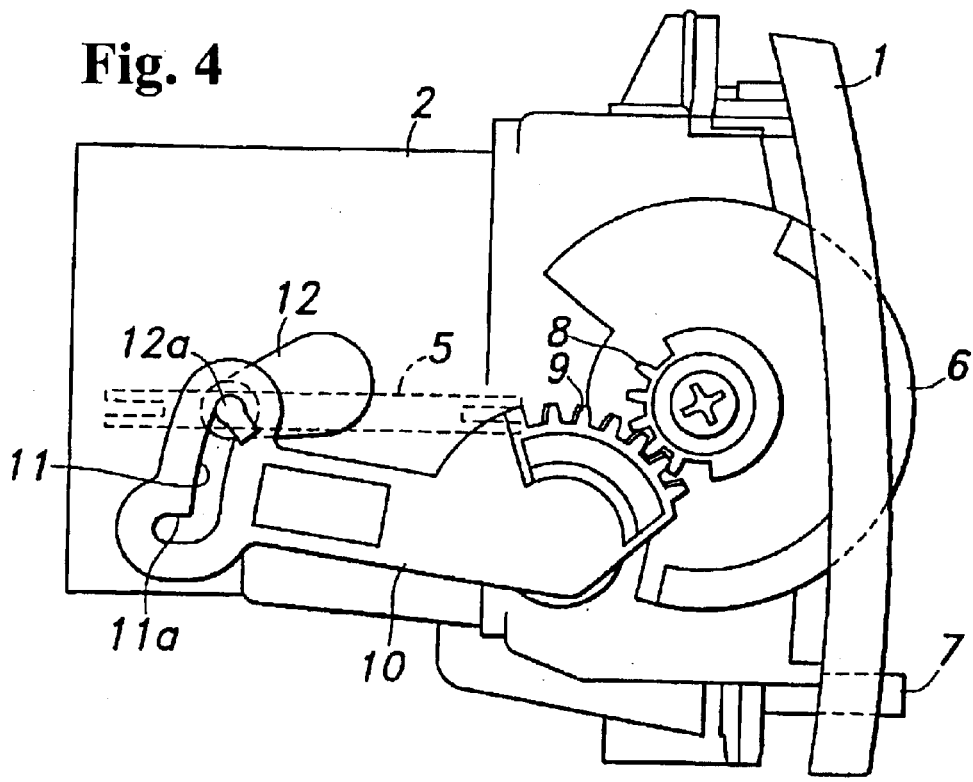
FIG. 4 is a left side view of the air outlet shown in FIG. 2 in a state where the damper is opened.

A pinion 8 coaxial with a central axis of rotation is formed integrally on a lateral surface of the side dial 6, as shown in FIGS. 3 and 4. A sector gear 9 engages the pinion 8.

A sector gear 9 is supported with an axis to be able to rotate freely on the sidewall of the case 2 diagonally lower front (an engine side) side relative to the rotational center of the side dial 6. A rocker arm 10 projects from the rotational center toward the engine side. At an end of the rocker arm 10, a long hole 11 with one end bent toward an outward direction is formed in roughly an L-shape. In the long hole 11, an end of a lever member 12 integrated on the rotational center axis of the damper 5 is connected.

When the side dial 6 is rotated downward (in the arrow direction) in a state that the damper 5 is closed as shown in FIG. 3, the rocker arm 10 rotates left due to an engagement between the pinion 8 and the sector gear 9. Then, an outward extension 11a at an end of the long hole 11 formed at an end of the rocker arm 10 pushes a pin 12a fixed to the end of the lever member 12 to drive the damper 5 in the opening direction. Because a rotational radius of the lever member 12 is smaller than a curvature of the long hole 11, the pin 12a at the end of the lever member 12 is aligned with the arc-shaped part of the long hole 11 at the end of the rocker arm 10 when the damper 5 reaches at a full opening position as shown in FIG. 4. Therefore, the damper 5 stays at the full opening position, and the side dial 6 can continue to rotate further downward within a limit of the long hole 11.

Figure 5:
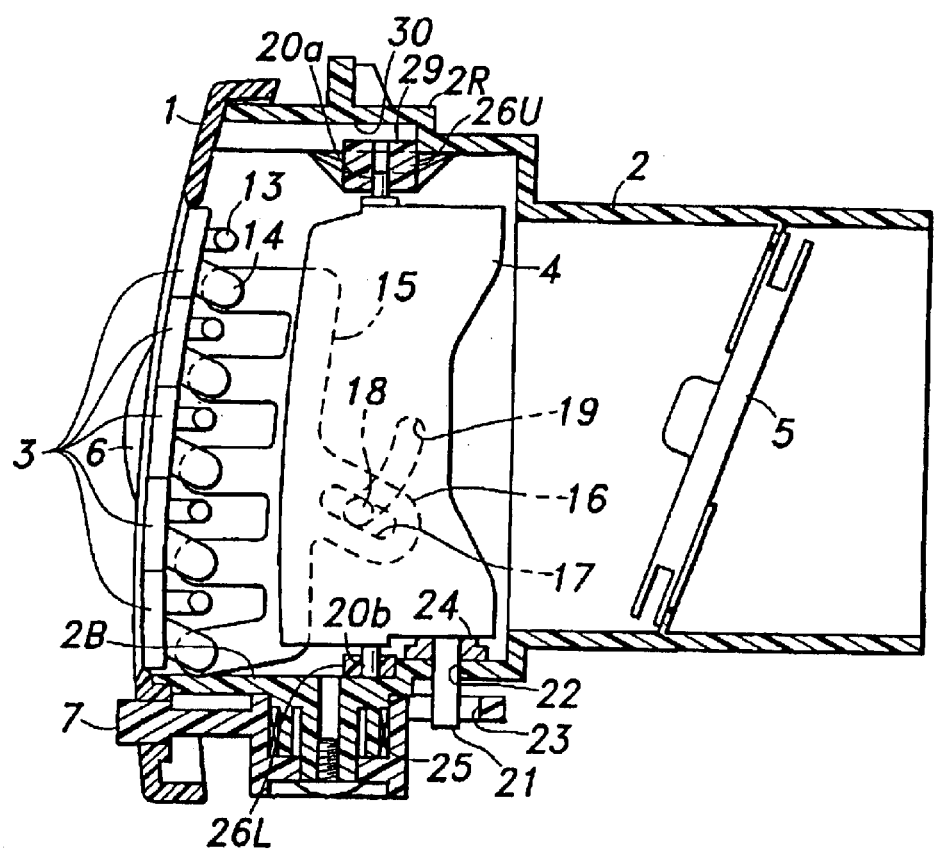
FIG. 5 is a sectional right side view of the air outlet shown in FIG. 2 in a state where the damper is closed.
Figure 6:
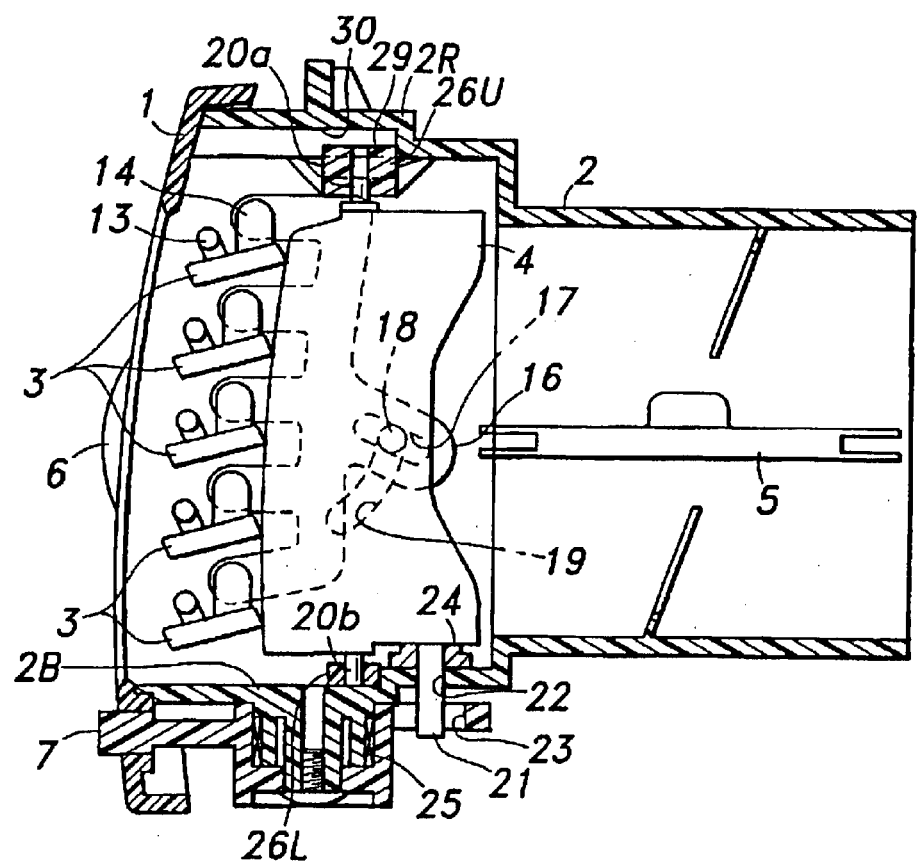
FIG. 6 is a sectional right side view of the air outlet shown in FIG. 2 in a state where the damper is opened.

The plurality (for example five) of the horizontal louver blades 3 is supported at both ends with the horizontal axes in an inner space between right and left sides of the case 2. And as shown in FIGS. 5 and 6, a supporting axis 13 of each horizontal louver blade 3 is located at an upper edge of a rear side of the horizontal louver blade 3 in a closed state (see FIG. 5), and is located next to an upper front edge of the horizontal louver blade 3 in an open state (see FIG. 6). In the closed state as shown in FIG. 5, each of the horizontal louver blades 3 is lined up with no space along the front arc surface of the flange 1. In the open state as shown in FIG. 6, each of the horizontal louver blades 3 is arranged to extend parallel with an appropriate gap in between.

An arm 14 projects on a rear side of each horizontal louver blade 3. The arm 14 is located on a lower edge of the rear side of the horizontal louver blade 3 in the closed state, and is located next to an upper rear edge of the horizontal louver blade 2 in the open state. In other words, the supporting axis 13 and the arm 14 are provided in a roughly symmetric position relative to a centerline along a longitudinal direction of the horizontal louver blades 3.

Each edge of the arms 14 is interconnected through an interlocking or interconnecting member 15 having a comb teeth shape. The arms 14 and the interlocking member 15 are connected to be able to rotate relatively, and all of the horizontal louver blades 3 are interconnected to be tilted at once by moving the interlocking member 15 up and down.

At the middle of the interlocking member 15 in the vertical direction, a projection 16 is formed to project toward the engine side. In the projection 16, a long hole 17 is formed along the horizontal direction.

A pin 18 projecting from the inner side of the side dial 6 is inserted in the long hole 17. The pin 18 passes through a long hole 19 formed on the sidewall of the case 2 and having an arc shape around the rotating shaft of the side dial 6, thereby regulating its movable range.

In the state that the damper 5 is closed as shown in FIG. 5, each of the horizontal louver blades 3 is also closed. When the side dial 6 is rotated downward from the state, the interlocking member 15 moves upward with the pin 18 integrated with the side dial 6, and each of the horizontal louver blades 3 connected to the interlocking member 15 tilts in the opening direction all at once. At the same time, the damper 5 opens as described above. After the damper 5 is fully opened as shown in FIG. 6, each of the horizontal louver blades 3 continues to tilt further in the opening direction within the regulated range by the arc-shape long hole 19 formed in the sidewall of the case 2. The vertical wind direction can be regulated according to the tilting angle of each horizontal louver blade 3 at this time.

The plurality (for example five) of the vertical louver blades 4 is supported with supporting axes 20a and 20b projecting from top and bottom ends at a top wall 2R and a bottom wall 2B of the case 2, so that the vertical louver blades 4 tilt horizontally around the vertical axes.

Figure 7:
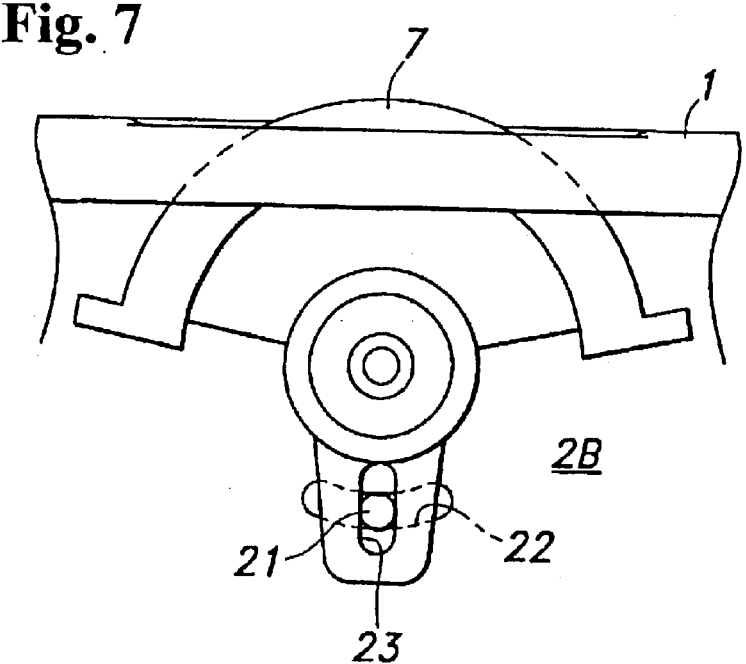
FIG. 7 is a partial bottom view of the air outlet shown in FIG. 2.

On a lower edge of one of the vertical louver blades 4 located at the middle among the vertical louver blades 4, a pin 21 is disposed vertically in a position shifted in front of the supporting axis 20b. As shown in FIG. 7, the pin 21 passes through a long hole 22 formed in the bottom wall 2B of the case 2 and having an arc shape around the lower dial 7. An end of the pin 21 engages the long hole 23 formed in the lower dial 7 along the horizontal direction. Also, projections (not shown) are disposed on the other vertical louver blades 4 at positions corresponding to the pin 21 of the middle vertical louver blade 4. All of the vertical louver blades 4 are interconnected through the engagements of the common line plate 24 with the projections and the pin 21.

With this configuration, when the lower dial 7 is rotated horizontally, all of the vertical louver blades 4 swing horizontally all at once.

Rotational resistance applying means 25 is provided at a portion where the lower dial 7 is attached to the bottom wall 2B of the case 2. Thus, an adequate rotational resistance is provided to the vertical louver blades 4, thereby preventing the vertical louver blades 4 from flapping.

Figure 8:
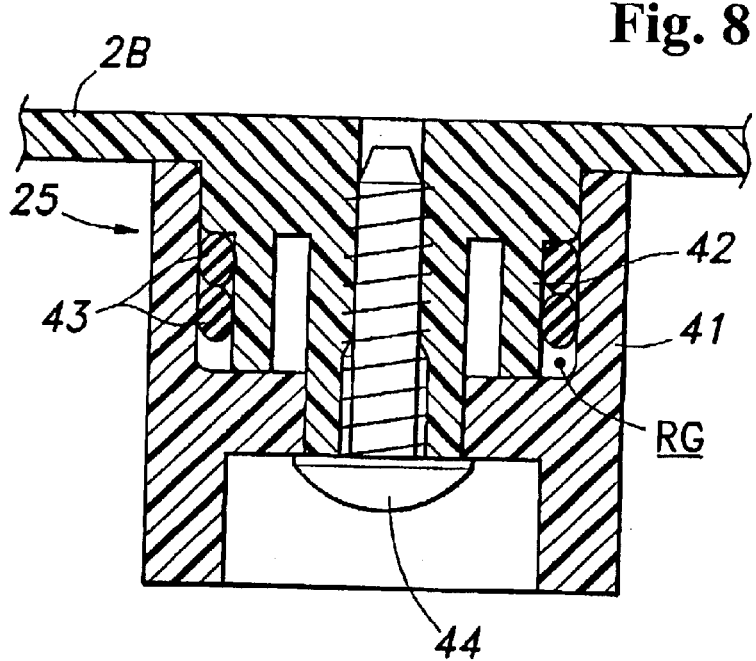
FIG. 8 is an enlarged sectional view of rotational resistance applying means.

As shown in FIG. 8, the rotational resistance applying means 25, which is provided at the portion where the lower dial 7 is attached to the bottom wall 2B of the case 2, includes a cylinder portion 41 integrated with the lower dial 7; a boss portion 42 projecting downward at the bottom wall 2B; and a plurality (2 in the current embodiment) of O-rings 43 disposed in series in the axial direction in a circular space RG formed in a fitting portion. The cylinder portion 41 is fixed not to come out with a screw 44 screwed in the center of the boss portion 42.

The o-rings 43 are formed of a silicone resin with self-lubricity, thereby reducing torque fluctuation caused by a temperature change. In addition, when the o-rings are used, the rotational resistance can be easily adjusted through the number of the rings or adjustment of a radial size of the circular space RG for mounting the o-rings. This rotational resistance applying means 25 can be applied to the supporting portion of the side dial 6 as well. The rotational resistance applying means is not limited to the O-rings, and, for example, silicone grease and the like can be filled in the space.

Figure 9:
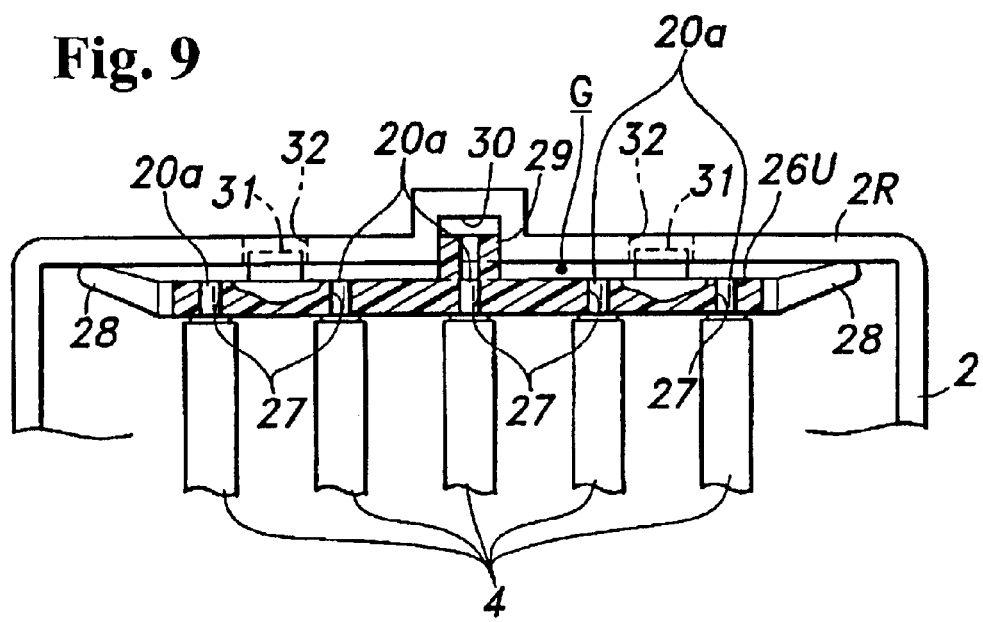
FIG. 9 is a front view of an essential portion in a state that an attaching portion of vertical louver blades of the air outlet shown in FIG. 2 is partially removed.

As shown in FIG. 9, the supporting axes 20a and 20b at top and bottom of the vertical louver blades 4 are fitted in the bearing holes 27 formed in the supporting plates 26U and 26L (not shown) attached to the top wall 2R and bottom wall 2B of the case 2. The supporting plates 26U and 26L are made of an elastic synthetic resin. The supporting plates 26U and 26L may be molded by the two-material molding method with inserting the pre-molded supporting axes 20a and 20b of the vertical louver blades 4, thereby reducing the number of manufacturing steps.

Figure 10:
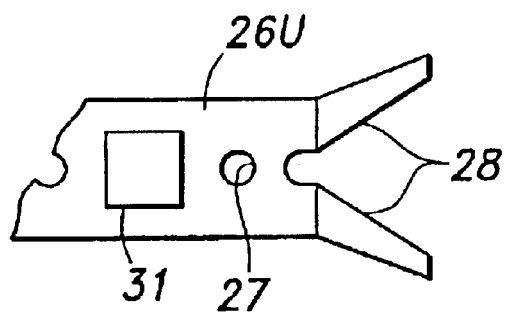
FIG. 10 is a plan view of an end portion of an upper supporting plate.

Among the supporting plates 26U and 26L, as shown in FIGS. 9 and 10, the upper supporting plate 26U attached to the top wall 2R is provided with a branched portion 28 bending upward at each of the right and left ends thereof. Only ends of the branched portion 28 abut against an under surface of the top wall 2R with vertical elasticity. Due to this structure, the upper side supporting plate 26U is supported more stably in the horizontal direction.

An upward projecting portion 29 is formed at the center of the upper side supporting plate 26U in the left-right direction. The projecting portion 29 engages a groove 30 extending in the back-forth direction and formed in the lower surface of the top wall 2R, thereby positioning the upper side supporting plate 26U in the left-right direction. In addition, the projecting portion 29 of the upper side supporting plate 26U contacts a front end of the groove 30, and pawls 31 formed on an upper surface of the upper side supporting plate 26U engage holes 32 provided in the top wall 2R, thereby defining a position of the upper side supporting plate 26U in the back-forth direction.

With this configuration, both right and left ends of the upper side supporting plate 26U contact the lower surface of the top wall 2R with elasticity. Also, there is an appropriate initial space G between the lower surface of the top wall 2R and the upper surface of the upper side supporting plate 26U. Therefore, when the case 2 is deformed due to the temperature change, the space G absorbs the deformation, thereby maintaining a constant axial force on the vertical louver blades 4. Accordingly, it is possible to reduce a change in the rotational torque of the vertical louver blades 4 due to the deformation of the case 2 caused by the temperature change.

Figure 11:
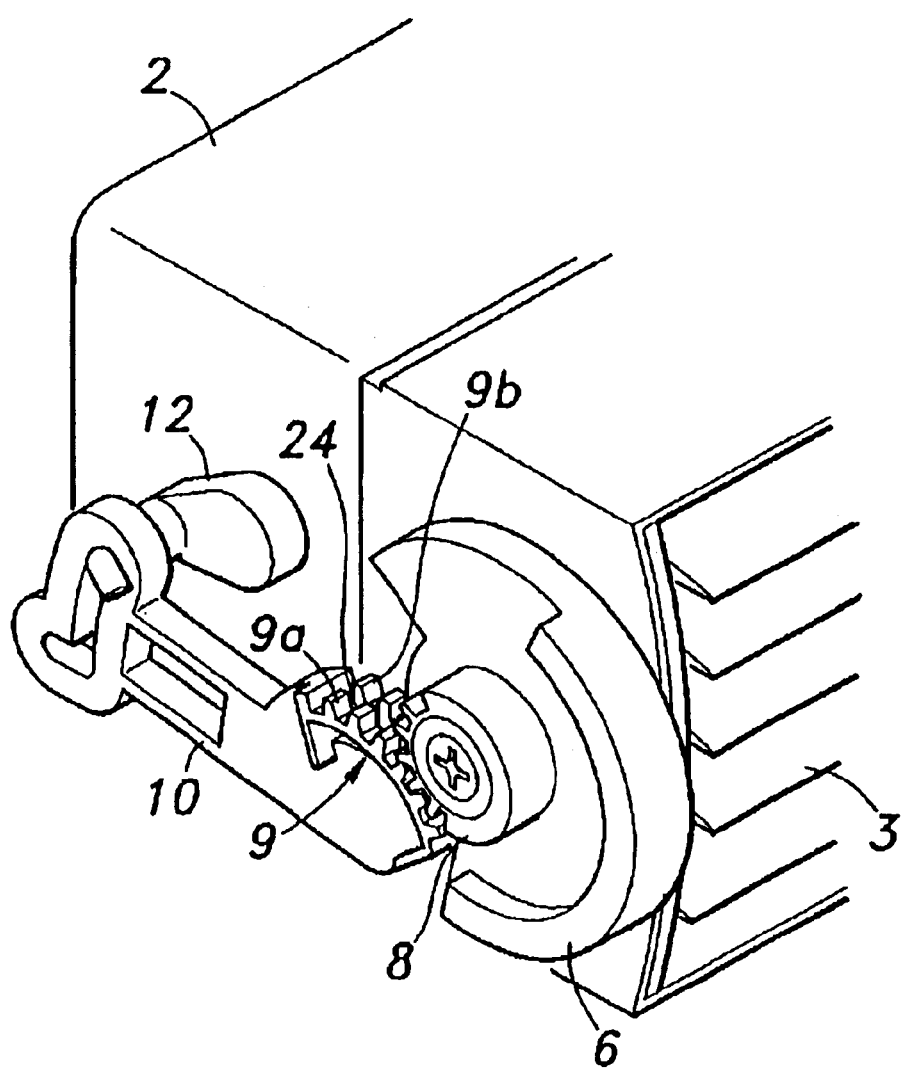
FIG. 11 is a perspective view of an essential portion of the air outlet shown in FIG. 2.

As shown in FIG. 11, a slit 24 divides the sector gear 9 into two parts along a surface perpendicular to the axis line. Gear teeth of the divided two parts 9a and 9b are formed to have a slightly offset pitch. The sector gear 9 is integrally formed of a synthetic resin, and the two parts 9a and 9b can displace slightly with each other in the circumferential direction due to intrinsic elasticity.

When the sector gear 9 engages the pinion 8, the pitch is shifted, and the elasticity causes a relative displacement in the circumferential direction. Thus, the tooth surface of the sector gear 9 closely contacts the tooth surface of the pinion 8, thereby preventing backlash and improving the operation for the side dial 6.

Figure 12:
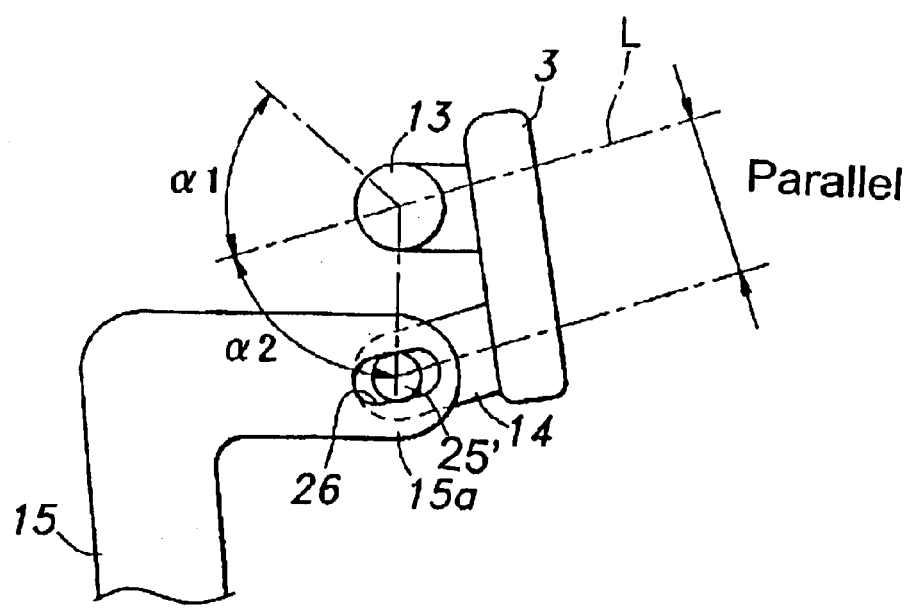
FIG. 12 is an enlarged left side view of a portion connecting between a horizontal louver blade and an interlocking member.

As shown in FIG. 12, a pin 25 projecting from an end of the arm 14 passes through a long hole 26 formed in an end of a comb teeth part 15a of the interlocking member 15, thereby interconnecting an end of the arm 14 of the horizontal louver blades 3 and the interlocking member 15. A long axis of the long hole 26 is parallel to a straight line L connecting a middle point ($\alpha1=\alpha2$) of the rotational range of the pin 25 and the center of the supporting axis 13. Therefore, it is possible to minimize a change in a frictional angle between the pin 25 and the long hole 26 when the horizontal louver blades 3 are tilted, thereby reducing loss when the multiple horizontal louver blades 3 are continuously driven, and reducing a change in the control force according to the rotational angle.

In the above-mentioned embodiments, the present invention is applied to the air outlet in the car compartment. However, the present invention is not limited to the application, and equally applicable to, for example, an air outlet for a household air conditioning system.

As described above, according to the present invention, one of the gears provided at the connecting portion between the manual operating member and the damper is divided in the axial direction, and the two divided parts are provided coaxially and have the slightly offset pitch so that they can displace with each other in the circumference direction with elasticity, thereby eliminating the backlash of the gear.

In addition, the angle of the long hole engaging the pin projected on the louver blades is set appropriately, thereby minimizing a change in the frictional angle between the long hole and the pin when the louver blades are tilted. Furthermore, the rotational resistance applying means is provided in the rotational central axis of the manual operating member, thereby eliminating a gap of the louver blades interlocked with the manual operating member.

Further, the elastic portion deformable in the axial direction of the louver blades is provided on the supporting plate for attaching the multiple louver blades to the air outlet, so that the elastic deformation of the supporting plate absorbs the heat deformation between the air outlet and the louver blades, thereby effectively stabilizing the rotational torque of the vertical louver blades.

Further, the elastic portions are provided on the both ends of the supporting plate, or the elastic portions are branched. Thus, the supporting plate is securely attached to the air outlet.

Also, the O-rings made of a silicone resin with self-lubricity are disposed at the supporting axis of the rotational operating portion that moves the interlocking member in the right-left direction, thereby reducing the torque fluctuation of the rotational operating portion caused by the temperature change.

While the invention has been explained with reference to the specific embodiments of the invention, the explanation is illustrative and the invention is limited only by the appended claims.

What is claimed is:

1. A regulator for regulating airflow in an air outlet, comprising:
    a case having a flange with the air outlet,
    a plurality of louver blades arranged at the air outlet for controlling a direction of the airflow and having axes at longitudinal ends,
    at least one interconnecting member connected to the louver blades for changing directions of the louver blades, and
    a supporting member attached to the flange at the air outlet and having axis holes for receiving the axes of the louver blades, said supporting member having elastic portions formed at two longitudinal ends thereof for allowing deformation in an axis direction of the louver blades.

2. A regulator according to claim 1, wherein each of said elastic portion has a branched shape, an end of which contacts the flange.

3. A regulator according to claim 1, further comprising an operating member rotatably supported on the case and having a shaft, said operating member being connected to the interconnecting member for tilting the louver blades, and rotational resistance applying means provided around the shaft of the operating member.

4. A regulator according to claim 3, wherein said rotational resistance applying means is formed of an O-ring between the shaft and a support thereof.

5. A regulator according to claim 4, wherein said O-ring is formed of a silicone resin having self-lubricity.

6. A regulator according to claim 1, further comprising an operating member rotatably supported on the case for tilting the louver blades, and an interconnecting member disposed between the louver blades and the operating member and having long holes for receiving pins of the louver blades, each of said long holes having a long axis parallel to a straight line between a middle point of a rotational range of the pin and the rotational center of the louver blade.

7. A regulator for regulating airflow in an air outlet, comprising:
    a case having the air outlet and an air path,
    a plurality of louver blades arranged at the air outlet for controlling a direction of the airflow,
    a damper disposed in the air path of the case for opening and closing the air path,
    an operating member rotatably attached to the case and connected to the louver blades and the damper for tilting the same, and
    connecting means for connecting the damper to the operating member and having first and second gear portions meshing each other and connected to the operating member and the damper, one of said first and second gear portions having divided gear teeth portions perpendicular to a shaft thereof, said divided gear teeth portions having pitches slightly offset in a circumference direction with each other so that the two gear teeth portions displace in the circumference direction when the first and second gear portions engage with each other.

8. A regulator according to claim 7, wherein said connecting means further includes a lever connected to the damper with a pin, and an arm rotationally attached to the case and having an elongated hole engaging the pin of the lever, said one of the first and second gear portions being formed on the arm away from the elongated hole.

9. A regulator according to claim 8, further comprising an interlocking member connected to the louver blades for changing directions thereof, said interlocking member being connected to the operation member.

10. A regulator for regulating airflow in an air outlet, comprising:
    a case having the air outlet and an air path,
    a plurality of louver blades arranged at the air outlet for controlling a direction of the airflow, each louver blade having a rotational center and a pin projecting at a position away from the rotational center,
    an operating member rotatably supported on the case for tilting the louver blades, and
    an interconnecting member disposed between the louver blades and the operating member and directly engaging the louver blades, said interconnecting member having long holes, each of said long holes receiving the pin of each louver blade and having a long axis parallel to a straight line between a middle point of a rotational range of the pin and the rotational center of the louver blade.

11. A regulator according to claim 10, wherein said long hole is inclined with respect to the pin so that when the interconnecting member is operated, the pin is pushed to tilt the louver blade around the rotational center.

* * * * *